(12) United States Patent
Araki et al.

(10) Patent No.: US 7,446,908 B2
(45) Date of Patent: Nov. 4, 2008

(54) IMAGE READER

(75) Inventors: Takao Araki, Kasuga (JP); Junichi Suematsu, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1013 days.

(21) Appl. No.: 10/799,711

(22) Filed: Mar. 15, 2004

(65) Prior Publication Data

US 2004/0184120 A1 Sep. 23, 2004

(30) Foreign Application Priority Data

Mar. 17, 2003 (JP) .................... P. 2003-071418

(51) Int. Cl.
*H04N 1/04* (2006.01)

(52) U.S. Cl. .................. 358/474; 358/491; 358/498; 399/302; 271/10.11

(58) Field of Classification Search ............... 358/474, 358/491, 496, 497, 468, 505; 399/302, 303; 271/10.11, 21, 262
See application file for complete search history.

(56) References Cited

U.S. PATENT DOCUMENTS

| | | | | |
|---|---|---|---|---|
| 4,743,974 A | * | 5/1988 | Lockwood | 358/494 |
| 5,463,451 A | * | 10/1995 | Acquaviva et al. | 399/211 |
| 6,044,236 A | * | 3/2000 | Katoh et al. | 399/101 |
| 6,594,039 B1 | * | 7/2003 | Kanbayashi | 358/491 |
| 6,995,878 B2 | * | 2/2006 | Fukuzawa | 358/474 |
| 7,130,088 B2 | * | 10/2006 | Breslawski et al. | 358/474 |
| 7,170,615 B2 | * | 1/2007 | Maeda et al. | 358/1.13 |
| 7,184,694 B2 | * | 2/2007 | Miho et al. | 399/302 |
| 2002/0020957 A1 | * | 2/2002 | Araki et al. | 271/10.11 |
| 2007/0269230 A1 | * | 11/2007 | Hoshino et al. | 399/45 |

FOREIGN PATENT DOCUMENTS

| | | |
|---|---|---|
| JP | 11-32163 | 2/1999 |
| JP | 2000-159393 | 6/2000 |
| JP | 2000-307821 | 11/2000 |

* cited by examiner

*Primary Examiner*—Edward L. Coles
*Assistant Examiner*—Negussie Worku
(74) *Attorney, Agent, or Firm*—Wenderoth, Lind & Ponack, L.L.P.

(57) ABSTRACT

An image reader includes a document table (2) having a platen plate (3) placed on an upper surface of the document table (2); a document table cover (4) supported at an upper end of the document table (2) in a pivotable manner; a first image sensor (5) which is provided in the document table (2) and is actuated in parallel with the platen plate (3) by means of a sensor drive mechanism (6); a document moving mechanism for causing the document to move along a document transport path (9) formed in the document table cover (4); and a second image sensor (20) fixed to the document table cover (4) so as to be situated at a position above the document transport path (9). A track of the document, which moves through the document transport path (9), passes through a focal point (scan point) of the first image sensor (5) achieved when the first image sensor (5) is situated at a standby position.

8 Claims, 6 Drawing Sheets

IMAGE READER

BACKGROUND OF THE INVENTION

1. Technical Field of the Invention

The present invention relates to an image reader for reading an image drawn on a document, and more particularly, to an image reader which can effect reading operations in both of a flat bed reading mode and a sheet through reading mode and read a document at high speed.

2. Description of the Related Art

In the field of an image reader used in a scanner, a facsimile, or the like, an image reader which can read a document in both a flat bed mode and a sheet through mode has conventionally been known (see, e.g., below mentioned Japanese Patent Documents 1 through 3). Here, the flat bed mode is a mode in which a lower surface of a document is scanned by a moving image sensor from below a platen plate to optically read an image on the document while a surface of the document to be read is placed and oriented downward on the platen plate provided on top of a document table. Further, the sheet through mode is a mode in which a document moving mechanism causes a document to move through a transport path and reads an image on the document by means of the image sensor while the document is moving.

FIG. 9 is a cross-sectional view of the principal feature of the conventional document reader (see Patent Document 1).

In FIG. 9, the conventional image reader is provided with a platen glass 101 placed on top of a document table 100. An image sensor 102 having a charge-coupled element (CCD) is provided in the document table 100 so as to be movable in parallel with the platen glass 101.

A document table cover 103 is pivotally supported at one end of the document table 100 (hereinafter, a side of the document table 100 pivotally supporting the document table cover 103 is called a "rear side," and the opposite side of the document table 100 is called a "front side"). A base end section of the document table cover 103 incorporates an automatic paper feeder 104. A hopper unit 105 to be used for loading documents to be fed is disposed at an upper front portion of the automatic paper feeder 104. Moreover, a recovery tray 106 is provided below the hopper unit 105. Provided in the automatic paper feeder 104 is a C-shaped transport guide 107 which extends from the hopper unit 105 to the recovery tray 106.

A paper feed roller 108 for feeding the document placed on the hopper unit 105 to the transport guide 107 is provided in an upper section of the entrance of the transport guide 107 (i.e., a portion of the transport guide 107 opened for the hopper unit 105). Further, a separation roller 109 and a retard roller 110 are provided so as to vertically, closely oppose each other at a position downstream of the transport guide 107 and adjacent to the paper feed roller 108. A plurality of transport rollers 111 to be used for transporting the document are provided along the transport guide 107.

When an image is read in a flat bed mode, the image sensor 102 reads an image on the document that is situated on the platen glass 101 so as to face downward, while moving below the platen glass 101 by means of a sensor drive mechanism (not shown).

When an image is read in the sheet through mode, the document is fed along the transport guide 107 while the image sensor 102 is situated stationary at the rear end section of the document table 100. A track of the document within the transport guide 107 passes through a focal point of the stationary image sensor 102 (hereinafter called a "scan point"). Therefore, when the document passes through the scan point, the image on a lower surface of the document is read by the image sensor 102. The document that has finished undergoing image reading operation is output to the recovery tray 106.

As mentioned above, reading of an image of a document is implemented in the flat bed mode and the sheet through mode by means of a single image sensor 102.

[Patent Document 1] JP-A-2000-159393
[Patent Document 2] JP-A-2000-307821
[Patent Document 3] JP-A-11-32163

However, the conventional image reader reads only one side of the document when an image on the document is read in the sheet through mode. Therefore, when images drawn on both sides of the document are read, an image on one side of the document is read first. Then, an image on the other side of the document is to be read by turning the document inside out. Therefore, reading of the document involves consumption of time.

Depending on the particular document, the document may have a large thickness and high flexural rigidity, like a piece of cardboard. When an attempt is made to read such a document, the document may be caught by the inside of the transport guide 107, to thereby cause a paper jam, while passing through the transport guide 107 bent like a letter C.

SUMMARY OF THE INVENTION

Accordingly, the present invention aims at providing an image reader capable of performing an operation for reading an image within a short period of time even when a document having images drawn on both sides thereof is read. The present invention also aims at providing an image reader capable of preventing occurrence of a paper jam even when a document has high flexural rigidity.

To solve the problem, an image reader of the present invention is characterized by comprising: a document table having a platen plate which is made from a translucent member and placed in an upper surface of the document table; a document table cover supported at an upper end of the document table in a pivotable manner; a first image sensor which is provided in the document table and is actuated in parallel with the platen plate by means of a sensor drive mechanism; a document moving mechanism for causing a document to move along a document transport path formed in the document table cover; and a second image sensor fixed to the document table cover so as to be situated at a position above the document transport path, wherein a track of the document which moves through the document transport path passes through a scan point, which is a focal point of the first image sensor achieved when the first image sensor is situated at a standby position.

By means of such a configuration, there can be provided an image reader capable of performing an image reading operation within a short period of time even when a document having images drawn on both sides thereof is to be read.

DETAILED DESCRIPTION OF THE PREFERRED EMBODIMENTS

An embodiment of the present invention will be described hereinbelow by reference to the accompanying drawings.

Figure 1:
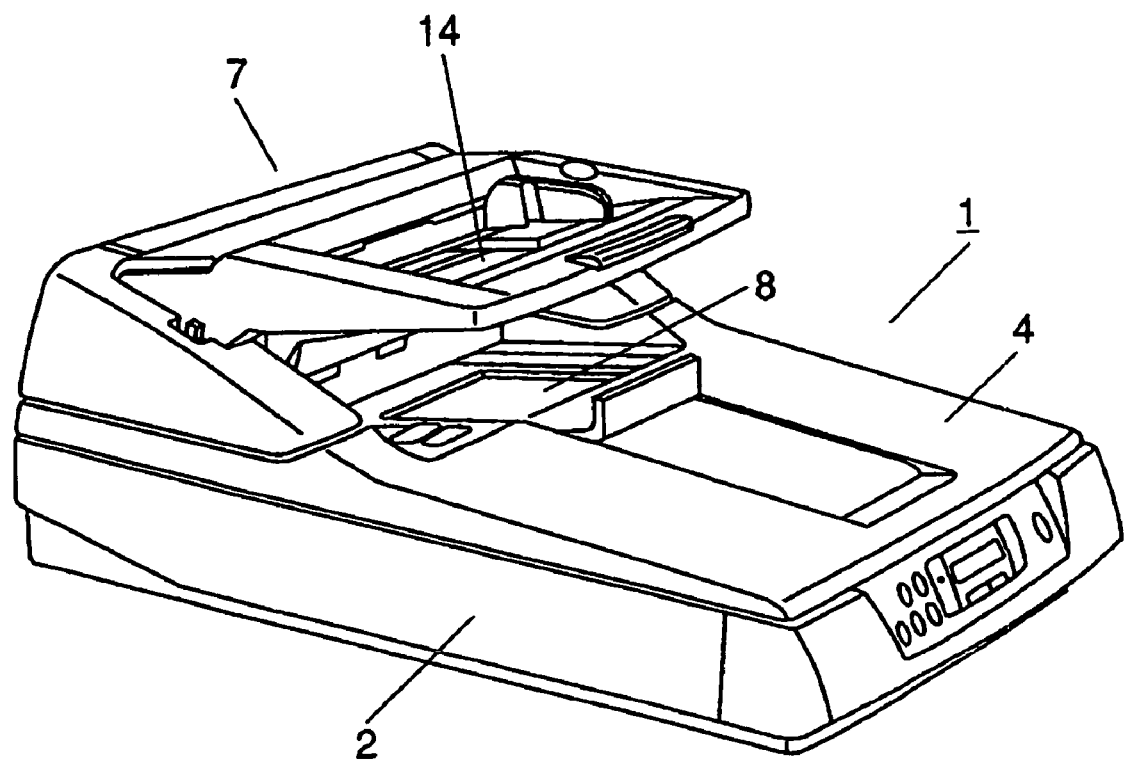
FIG. 1 is a perspective appearance view of an image reader according to an embodiment of the present invention.
Figure 2:
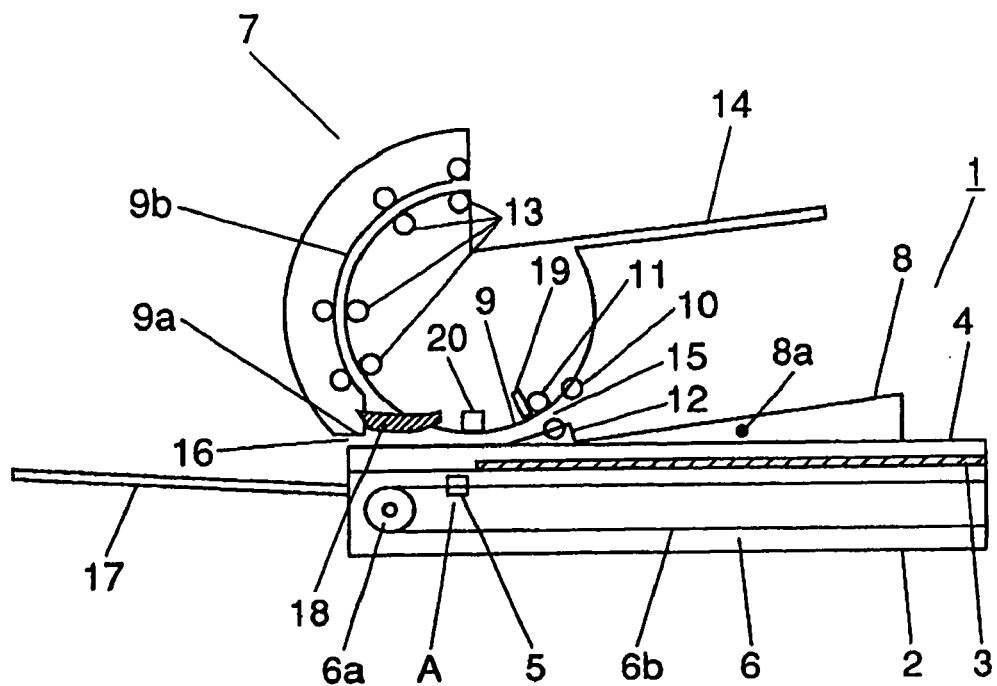
FIG. 2 is a cross-sectional view of the principal feature of the image reader of the embodiment of the present invention.

FIG. 1 is a perspective view of an image reader according to an embodiment of the present invention showing the appearance thereof, and FIG. 2 is a cross-sectional view of the principal feature of the image reader according to the embodiment of the present invention.

In FIGS. 1 and 2, an image reader 1 of the present invention has a substantially-rectangular-parallelepiped document table 2, and a platen plate 3 made from a translucent member is provided on the upper surface of the document table 2. A document table cover 4 covering the upper surface of the document table 2 is pivotally supported at one end of the document table 2. Hereinafter, the part of the document table 2 where the document table cover 4 is pivotally supported is called a "rear side," and the opposite part of the document table 2 is called a "front side."

A first image sensor 5 which can move in parallel to the platen plate 3 is provided within the document table 2. The first image sensor 5 is driven by a sensor drive mechanism 6 which moves the first image sensor 5 back and forth by means of rotation of a belt 6b passed around a pulley 6a.

An automatic paper feeder 7 for reading an image on a document by means of a sheet through mode is provided on the rear side of the document table cover 4. The automatic paper feeder 7 is equipped with a hopper plate 8, a document transport path 9, a paper feed roller 10, a separation roller 11, a retard roller 12, a plurality of transport rollers 13, and a recovery tray 14.

The hopper plate 8 is disposed in a lower front portion of the automatic paper feeder 7, and the rear end section of the hopper plate 8 is forced upward by a spring 8a. Moreover, the recovery tray 14 is provided on an upper portion of the hopper plate 8.

In the document transport path 9, an entrance (i.e., a paper feed port) 15 is opened at the rear end section of the hopper plate 8, and the inside of the document transport path 9 is divided into a first path 9a and a second path 9b. Transport switching means 18 is provided at this junction section in order to switch the moving direction of the document between the first path 9a and the second path 9b. The document transport path 9 is constituted so as to pass through a focal point (scan point) of the first image sensor 5 located at a standby position A in an area upstream of the junction section.

The transport switching means 18 is constituted of a separation lug pivotally supported on the junction section so as to be rotatable. When the separation lug has been rotated upward (counterclockwise) and situated at a standby position, the document is fed to the first path 9a. In contrast, when the separation lug has been rotated downward (clockwise), the document is guided by the separation lug and delivered to the upper second path 9b.

The first path 9a extends substantially linearly from the paper feed port 15 of the document transport path 9. An output port 16 of the first path 9a is situated at the back of the automatic paper feeder 7. A recovery tray 17 coupled to the document table 2 is disposed at a position below the paper output port 16.

The second path 9b is formed so as to become curved in the manner of the letter C from the paper port 15 of the document transport path 9. The paper output port is situated at a position above the upper recovery tray 14 of the automatic paper feeder 7. Further, the plurality of transport rollers 13 for feeding a document are disposed along the second path 9b.

The paper feed roller 10 is disposed at the entrance of the document transport path 9, thereby feeding the document loaded on the hopper plate 8 to the inside of the document transport path 9. The separation roller 11 and the retard roller 12 are provided adjacent to the paper feed roller 10 within the document transport path 9. The separation roller 11 is disposed at an upper portion of the document transport path 9, and the retard roller 12 is disposed at a lower portion of the document transport path 9. The rollers 11, 12 oppose each other at the center of the document transport path 9. The separation roller 11 and the retard roller 12 prevent overlapping transport of documents to be fed.

Document thickness detection means 19 for detecting the thickness of a document is disposed downstream of the separation roller 11 and the retard roller 12. The document thickness detection means 19 is constituted of an ultrasonic sensor or the like. On the basis of the thickness of the document detected by the document thickness detection means 19, control means (not shown) controls the direction in which the transport switching means 18 is to be switched (which will be described later).

Moreover, a second image sensor 20 is disposed at an upper portion of the document transport path 9 located between the document thickness detection means 19 and the transport switching means 18. The second image sensor 20 reads an image on the upper surface of the document which moves through the document transport path 9.

Operation of the image reader of the present embodiment having the foregoing construction will be described hereinbelow.

Figure 3:
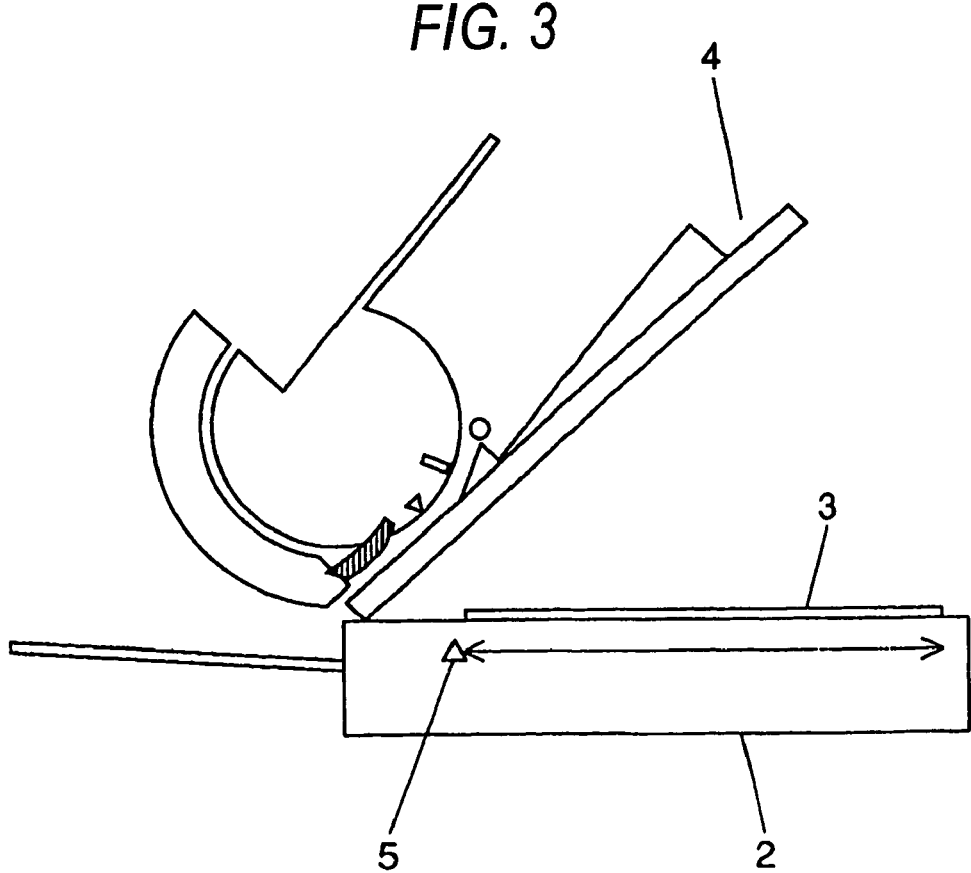
FIG. 3 is a view for describing an operation for reading an image on a document in a flat bed mode.

First, operation for reading an image on a document in a flat bed mode will be described. FIG. 3 is a view for describing operation for reading an image on a document in a flat bed mode.

In the case of a reading operation in a flat bed mode, the document table cover 4 is opened as shown in FIG. 3, and the document is placed on top of the platen plate 3 so as to face downward. Then, the document table cover 4 is closed, thereby completing setting of the document. Subsequently, an image on the document is read by means of actuating the first image sensor 5 from back to front in parallel to the platen plate 3 so as to perform scanning through the use of the sensor drive mechanism 6. These operations are identical with operations of an ordinary image reader.

Next, an operation for reading an image on a document in a sheet through mode will be described.

Figure 4:
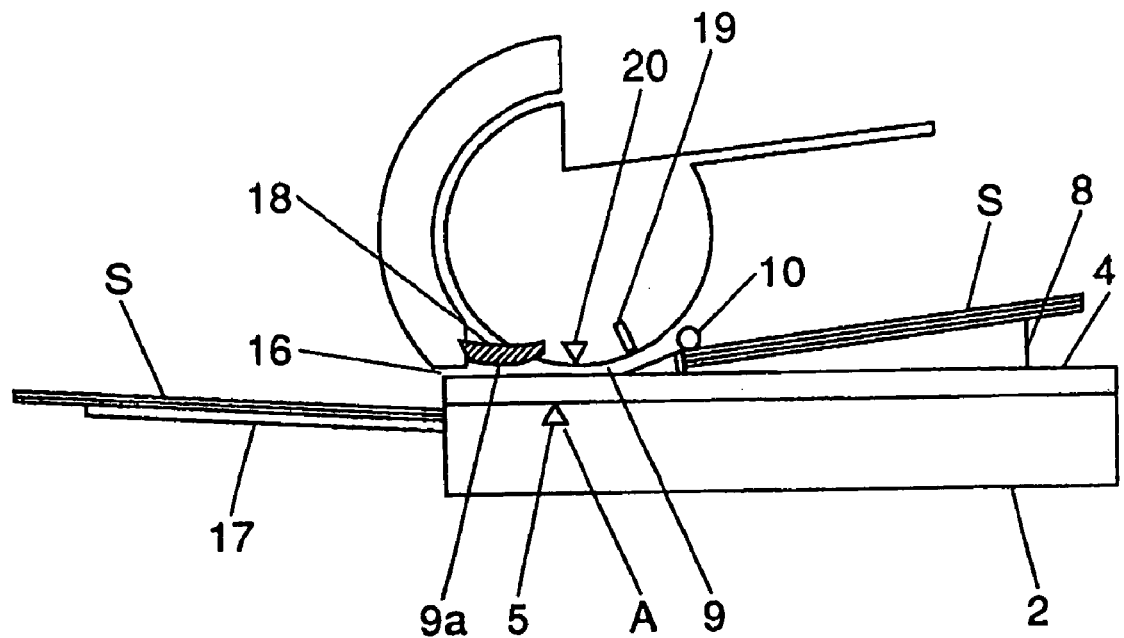
FIG. 4 is a view for describing an operation to be performed when an image is read by causing the document to move linearly.
Figure 5:
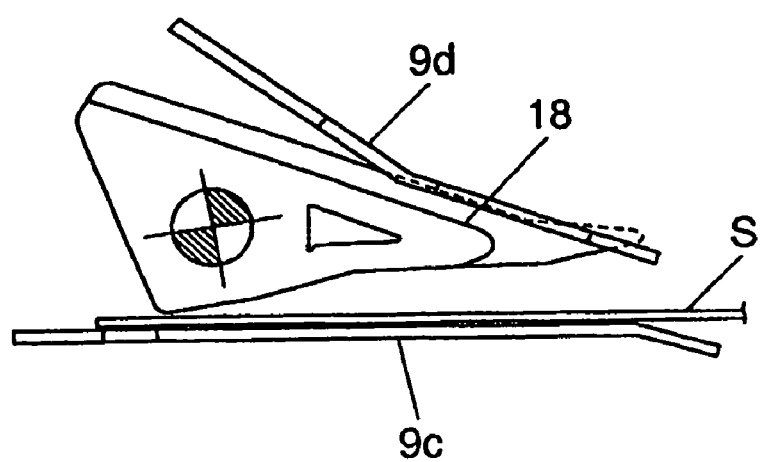
FIG. 5 is an enlarged view showing the state of the transport switching means shown in FIG. 4.
Figure 6:
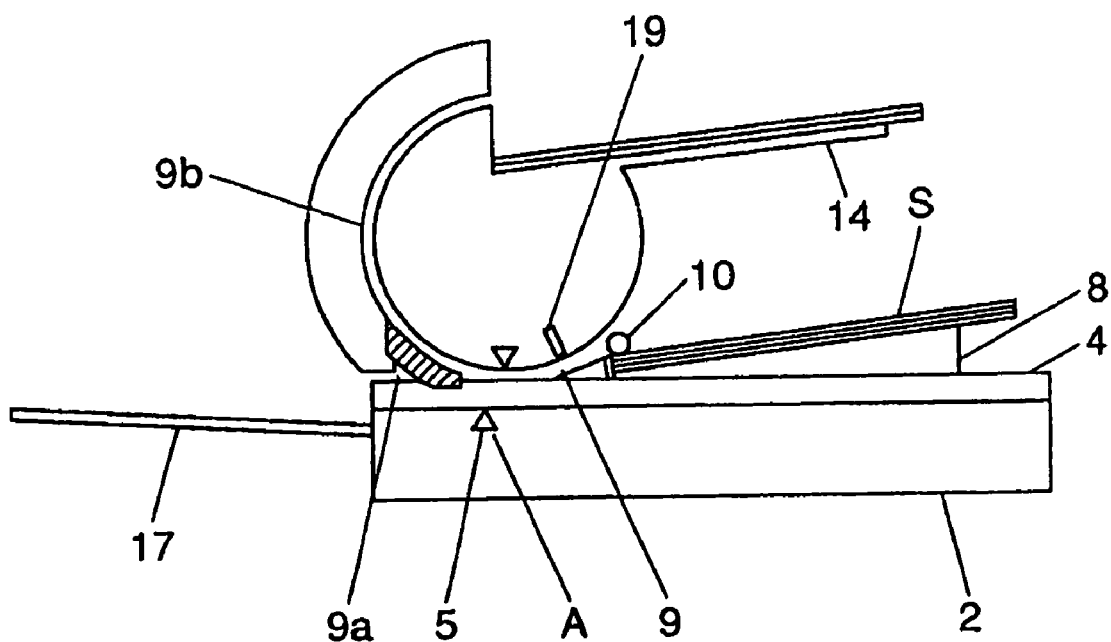
FIG. 6 is a view for describing a case where an image is read by causing the document to move so as to make a turn.

FIG. 4 is a view showing an operation to be performed when an image is read while a document is caused to move linearly; FIG. 5 is an enlarged view showing the state of the transport switching means shown in FIG. 4; FIG. 6 is a view for describing an operation to be performed when the document is read while being caused to move so as to move in reverse; and FIG. 7 is an enlarged view showing the state of the transport switching means shown in FIG. 6.

When paper is output linearly along the first path 9a of the document transport path 9, the transport switching means 18 is situated at an upper position as shown in FIGS. 4 and 5. The first image sensor 5 is held stationary at the standby position A.

In this state, a document S is fed to the inside of document transport path 9 by means of the paper feed roller 10. While the document moves through the inside of the document transport path 9, an image on the upper surface of the document is read by the second image sensor 20, and an image on the lower surface of the same document is read by the first image sensor 5. The document S whose images have been thus read is transported to the junction of the document transport path 9. At this time, the separation lug; that is, the transport switching means 18, is situated at an upper standby position, and hence the document S is transported to the first path 9a along a lower transport guide 9c of the document transport path 9 and then output from the output port 16, whereupon the document S is recovered on the recovery tray 17.

Figure 7:
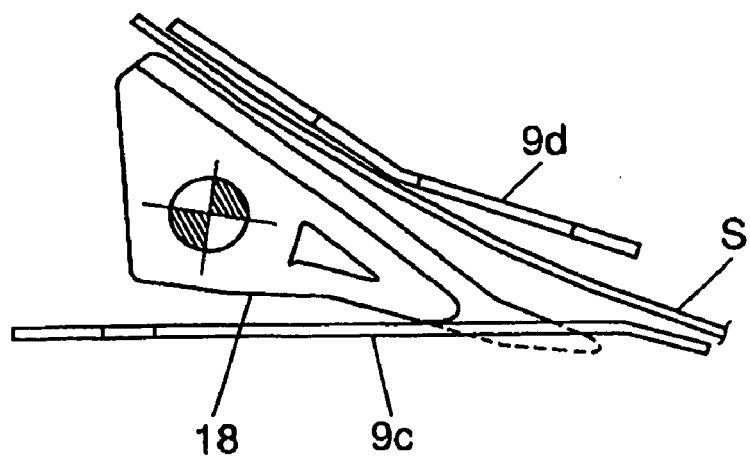
FIG. 7 is an enlarged view showing the state of the transport switching means shown in FIG. 6.

Next, when the document is reversed and output along the second path 9b of the document transport path 9, the transport switching means 18 is pivotally moved downward as shown in FIGS. 6 and 7, thereby placing the extremity of the transport switching means 18 at a position lower than the transport guide 9c. The first image sensor 5 is held stationary at the standby position A.

In this state, the document S is fed through the document transport path 9 by means of the paper feed roller 10. The document moves through the document transport path 9, and an image on the upper surface of the document is read by the second image sensor 20. An image on the lower surface of the document S is read by the first image sensor 5. The document S whose images have been read is transported to the junction section of the document transport path 9. At this time, the extremity of the separation lug that also acts as the transport switching means 18 is located at a position lower than the transport guide 9c. Hence, the document S is guided by the separation lug and transported to the second path 9b. The document S is transported through the inside of the second path 9b by means of the transport roller 13 and recovered on the recovery tray 14.

As mentioned above, when the original image is read in a sheet through mode, reading of the image on the lower surface of the document S is performed by the first image sensor 5. As a result, the image sensor for reading an image on a lower surface of the document can also be embodied by an image sensor to be used for reading operation in a flat bed mode. Accordingly, the number of image sensors can be reduced by one, thereby enabling miniaturization of the image reader.

When images of the document are read in a sheet through mode, images on both sides of the document are simultaneously read through use of the first image sensor 5 and the second image sensor 20. Therefore, the images on both sides of the document can be read at high speed.

Moreover, when a document having a large thickness and high flexural strength is read, the document is output by means of switching the document transport path to the first path 9a through use of the transport switching means 18. Since the document is linearly transported and output, catching of the document in the document transport path 9 can be prevented.

Finally, there will be described a case where the document transport path is automatically switched in accordance with the thickness of the document.

Figure 8:
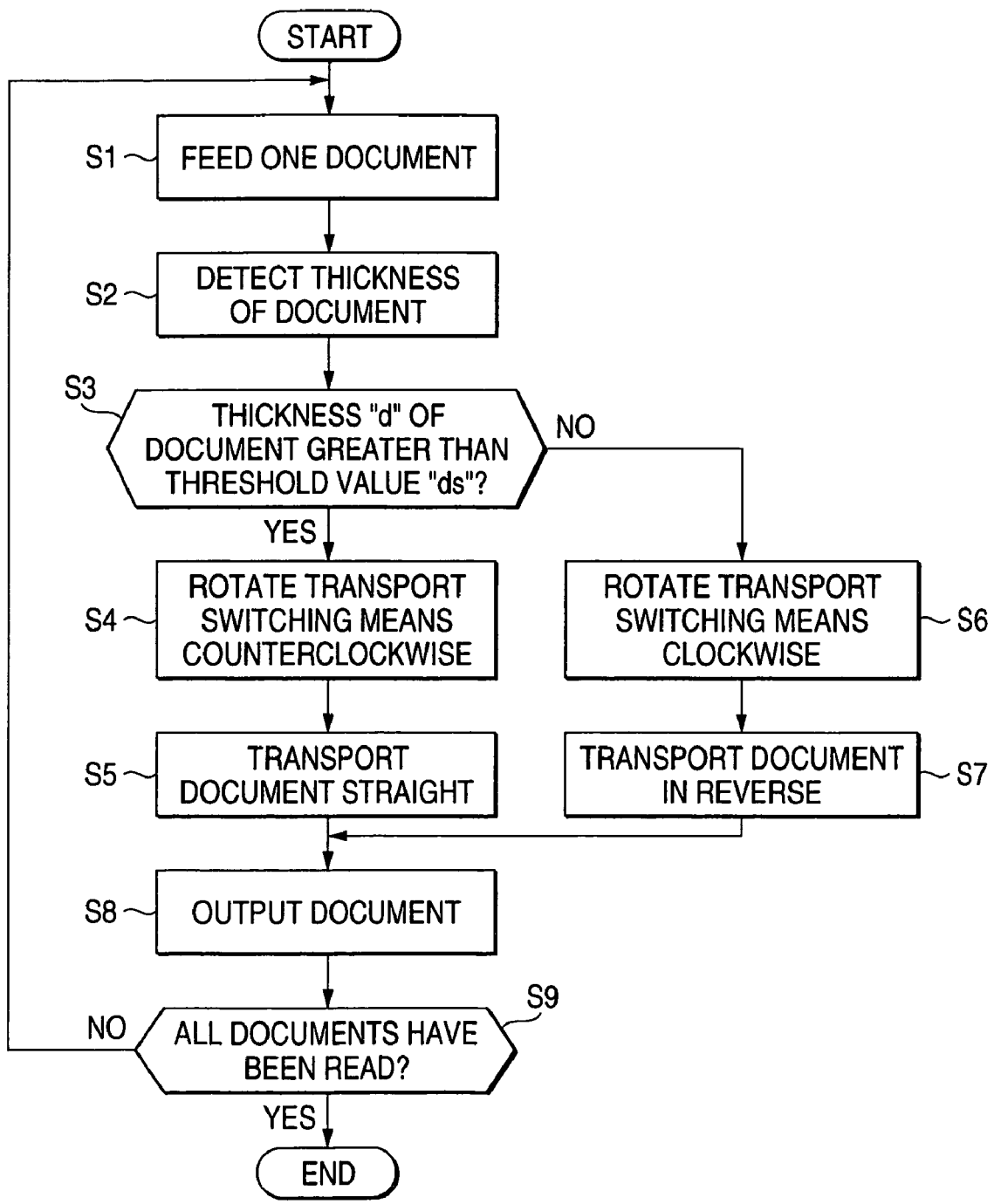
FIG. 8 is a flowchart showing an operation for automatically switching a document transport path.
Figure 9:
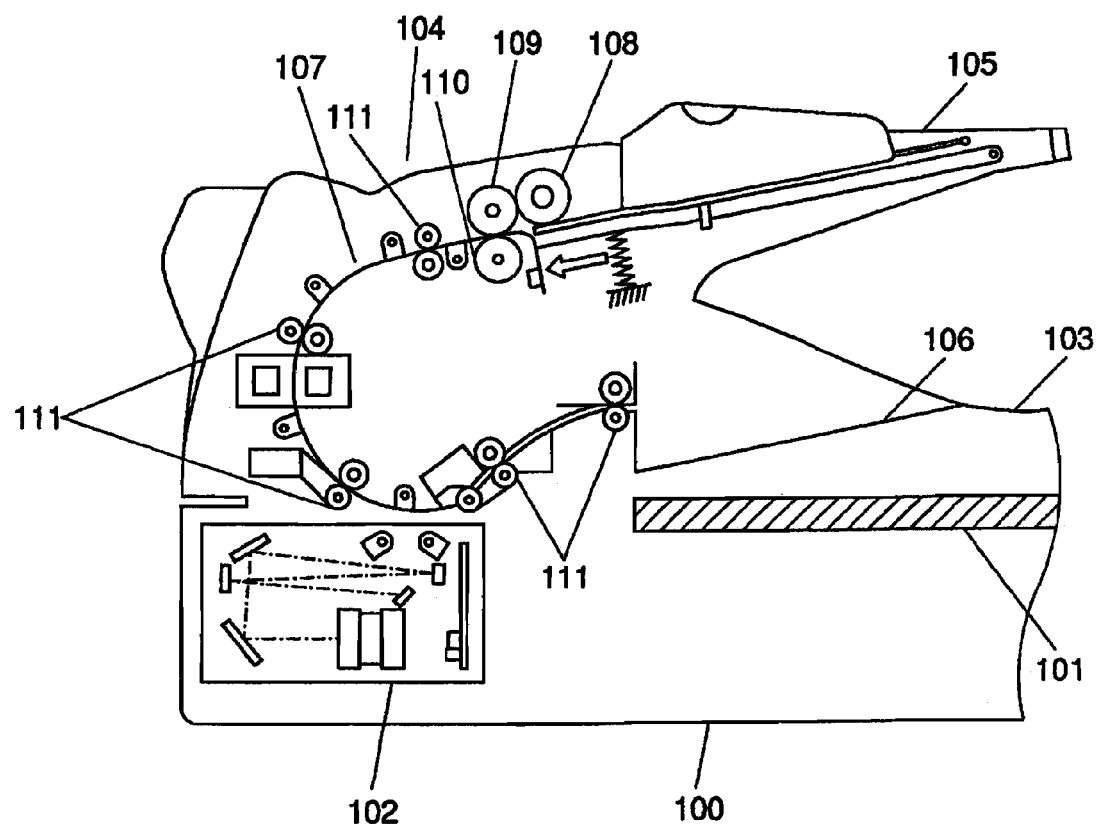
FIG. 9 is a cross-sectional view of a principal feature of a conventional document reader.

FIG. 8 is a flowchart showing operation for automatically switching the document transport path.

First, the document S on the hopper plate 8 is transported to the inside of the document transport path 9 by means of the paper feed roller 10 (S1). The document thickness detection means 19 detects the thickness "d" of the document which moves through the inside of the document transport path 9 (S2).

A determination is made as to whether or not the thickness "d" of the document is greater than a predetermined threshold value "ds" (S3). When d>ds, the control means brings the transport switching means 18 into an upper standby position (S4), thereby guiding the document S to be transported to the first path 9a (S5). The document S is output by way of the paper output port 16 and recovered by means of the recovery tray 17 (S8).

When d≦ds is determined in step S3, the control means pivots the transport switching means 18 downward (S6), thereby guiding the document S to be transported to the second path 9b (S7). The document S is transported through the inside of the second path 9b and recovered by means of the recovery tray 14 (S8).

If reading of all the documents has not yet been completed (S9), operations pertaining to steps S1 to S9 are iterated. At a point in time when reading of all the documents has been completed (S9), the operations are completed.

As mentioned above, the thickness of the document moving through the inside of the document transport path 9 is automatically detected by the document thickness detection means 19. The direction in which the transport switching means 18 is to be switched is automatically switched by the control section in accordance with the thickness of the document. Even when a bundle of documents, including documents of different thicknesses, are consecutively read in a sheet through mode, catching of the documents within the document transport path 9 can be prevented.

As mentioned above, an image reader according to a first aspect of the present invention comprises: a document table having a platen plate which is made from a translucent member and placed in an upper surface of the document table; a document table cover supported at an upper end of the document table in a pivotable manner; a first image sensor which is provided in the document table and is actuated in parallel with the platen plate by means of a sensor drive mechanism; a document moving mechanism for causing a document to move along a document transport path formed in the document table cover; and a second image sensor fixed to the document table cover so as to be situated at a position above the document transport path, wherein a track of the document which moves through the document transport path passes through a scan point, which is a focal point of the first image sensor achieved when the first image sensor is situated at a standby position.

By means of this configuration, when an image on the document placed on the document table is read, the first image sensor is moved in parallel with the platen plate by means of the sensor drive mechanism while the document is placed on top of the platen plate. As a result, the image on the document can be read by means of the first image sensor. When documents are continuously read or a like situation, the document is caused to move through the document transport path by means of the document moving mechanism while the first image sensor is held stationary in a standby position. The track of the moving document passes through the scan point, and hence an image on the lower surface of the document can be read by means of the first image sensor provided immediately below the scan point. Further, the second image sensor is fixed at a position above the document transport path and, therefore, can also read an image on the upper surface of the document simultaneously.

As mentioned above, the image sensor—which reads an image on the lower surface of the document when the document is moving—is also embodied by the first image sensor which reads the image on the lower surface of the document while the document is placed on top of the platen plate. Accordingly, reading of an image on the lower surface of the document while the document is placed on top of the platen plate and reading of images on both surfaces of the document while the document is caused to move by the document moving mechanism can be carried out through use of only two image sensors.

During movement of the document, the upper and lower surfaces of the document are read by two image sensors by a single operation. Hence, the time required to read the document becomes shorter, thereby enabling high-speed reading of images on the document.

Here, a CCD, a contact image sensor (CIS), or the like can be used as the image sensors. Further, the document moving mechanism can be a mechanism for causing the document to move through use of a commonly-used transfer roller or a mechanism for transporting a document by means of spraying or absorbing air. A glass plate or a transparent plastic plate can be used as the platen plate. A mechanism using a commonly-used belt, a drive mechanism using a linear motor, a drive mechanism using a spline shaft, or the like is used as the sensor drive mechanism.

Here, the expression "standby position of the first image sensor" means a position where the first image sensor is to be placed in a standby condition during a period in which operation for reading a document is not performed. In normal times, the standby position is set in the vicinity of one end section within the movable range of the first image sensor.

In the present invention, the standby position of the first image sensor can be set to the neighborhood of the end section of the document table where the document table cover is pivotally supported. As a result, the track of the moving document comes close to the upper surface of the platen plate, in the vicinity of the end section of the platen plate where the document table cover is pivotally supported. Accordingly, the track of the document is caused to extend from the center of the platen plate to the end section of the document table where the document table cover is pivotally supported. As a result, a paper feed hopper, where a read document to be fed to the inside of the document transport path is placed, can be housed in the document table cover of the upper section of the document table. Consequently, the image reader can be miniaturized.

Additionally, according to a second aspect of the invention, in the image reader, a portion of the document transport path located downstream from the scan point is divided into a first path and a second path; and transport switching means is disposed at a location where the document transport path is divided, in order to switch the track of the document moving through the document transport path between the first and second paths.

As mentioned above, the document transport path is branched at a position downstream from the scan point, thereby switching the moving direction of the document between a first path and a second path. As a result, there can be selected a direction in which the document whose image has been read by the first image sensor is to be output. Accordingly, the document can be output in a desired direction depending on the state of the location where the image reader is situated.

Here, the second image sensor can be disposed at an upstream position with reference to the point where the document transport path is divided. As a result, even when the document is caused to move to either the first or second path, the second image sensor can read an upper surface of the document.

A movable guide is disposed as the transport switching means at the junction of the document transport path. The movable guide may assume the form of a mechanism for switching the transport path of the document by means of pivotally moving the movable guide, a mechanism for switching the transport path of the document by means of moving the position of the transport roller constituting the document transport mechanism, or the like.

Further, the transport switching means may be switching means which is manually switched or automatically switched.

According to third aspect of the invention, the first path is formed in parallel or substantially in parallel to the track of the document transport path at a position upstream of the scan point; and the second path is formed so as to be turned upward.

As mentioned above, the first path is formed in parallel or substantially in parallel to the track of the document transport path at a position upstream of the scan point. Hence, in the case of a document having a large thickness or large flexural strength, the document is smoothly transported by means of switching the transport switching means such that the document is fed along the first path. In contrast, in the case of a document having ordinary, low flexural strength, the document is turned upward to return and be output to a position above the document table, so long as the transport switching means is switched such that the document is fed along the second path. Since the document returns to the direction in which it has originally been inserted, convenience of recovery of the document is improved.

When only a small footprint is available; for example, when a wall exists ahead of a location where the image reader is to be placed, the transport switching means is switched, to thereby feed the document to the second path. As a result, the footprint of the image reader can be reduced.

Further, according to fourth aspect of the invention, the image reader further comprises document thickness detection means which is disposed upstream of the scan point and detects the thickness of the document to move through the document transport path; and control means that performs control operation for switching the transport switching means to the first path when the thickness of the document detected by the document thickness detection means is greater than a predetermined threshold value and switching the transport switching means to the second path when the thickness of the document detected by the document thickness detection means is smaller than the predetermined threshold value.

By means of this configuration, in accordance with the thickness of the document detected by the document thickness detection means, the control means automatically switches the document transport path in an optimal output direction. Hence, occurrence of a paper jam, which would otherwise be caused by the document, can be effectively prevented.

The present disclosure relates to subject matter contained in priority Japanese Patent Application No. 2003-071418 filed on Mar. 17, 2003, the content of which is herein expressly incorporated by reference in its entirety.

What is claimed is:

1. An image reader comprising:
a document table having a platen plate which is made from a translucent member and placed in an upper surface of said document table;

a document table cover supported at an upper end of said document table in a pivotable manner;

a first image sensor provided in said document table;

a sensor drive mechanism for actuating said first image sensor in parallel with said platen plate;

a document moving mechanism for causing a document to move along a document transport path formed in said document table cover;

a second image sensor fixed to said document table cover so as to be situated at a position above said document transport path, wherein a track of said document which moves through said document transport path passes through a scan point, which is a focal point of said first image sensor achieved when said first image sensor is situated at a standby position;

wherein a portion of said document transport path located downstream from said scan point is divided into a first path and a second path;

transport switching means, disposed at a location where said document transport path is divided, for switching said track of the document moving through said document transport path between said first and second paths;

document thickness detection means, disposed upstream of said scan point, for detecting the thickness of the document to move through said document transport path; and control means for performing a control operation to switch said transport switching means to said first path when the thickness of the document detected by said document thickness detection means is greater than a predetermined threshold value and to switch said transport switching means to said second path when the thickness of the document detected by said document thickness detection means is smaller than said predetermined threshold value.

2. An image reader comprising:

a document table having a platen plate which is made from a translucent member and is placed in an upper surface of said document table;

a document table cover supported at an upper end of said document table in a pivotable manner;

a first image sensor provided in said document table;

a sensor drive mechanism for actuating said first image sensor in parallel with said platen plate;

a document moving mechanism for causing a document to move along a document transport path formed in said document table cover;

a second image sensor fixed to said document table cover so as to be situated at a position above said document transport path, wherein a track of the document which moves through said document transport path passes through a scan point, which is a focal point of said first image sensor achieved when said first image sensor is situated at a standby position, wherein a portion of said document transport path, located downstream from said scan point, is divided into a first path and a second path;

transport switching means, disposed at a location where said document transport path is divided, for switching said track of the document moving through said document transport path between said first and second paths, wherein said first path is formed in parallel or substantially in parallel to said track of said document transport path at a position upstream of said scan point, and said second path is formed so as to be turned upward;

document thickness detection means, disposed upstream of said scan point, for detecting the thickness of the document to move through said document transport path; and control means for performing a control operation to switch said transport switching means to said first path when the thickness of the document detected by said document thickness detection means is greater than a predetermined threshold value and to switch said transport switching means to said second path when the thickness of the document detected by said document thickness detection means is smaller than said predetermined threshold value.

3. An image reader comprising:

a document table having a platen plate which is made from a translucent member and is placed in an upper surface of said document table;

a document table cover supported at an upper end of said document table in a pivotable manner;

a first image sensor provided in said document table;

a sensor drive mechanism for actuating said first image sensor in parallel with said platen plate;

a document moving mechanism for causing a document to move along a document transport path formed in said document table cover, wherein a track of the document which moves through said document transport path passes through a scan point, which is a focal point of said first image sensor achieved when said first image sensor is situated at a standby position, wherein a portion of said document transport path located downstream from said scan point is divided into a first path and a second path;

transport switching means, disposed at a location where said document transport path is divided, for switching said track of the document moving through said document transport path between said first and second paths;

document thickness detection means, disposed upstream of said scan point, for detecting the thickness of the document to move through said document transport path; and control means for performing a control operation to switch said transport switching means to said first path when the thickness of the document detected by said document thickness detection means is greater than a predetermined threshold value and to switch said transport switching means to said second path when the thickness of the document detected by said document thickness detection means is smaller than said predetermined threshold value.

4. An image reader comprising:

a document table having a platen plate which is made from a translucent member and is placed in an upper surface of said document table;

a document table cover supported at an upper end of said document table in a pivotable manner;

a first image sensor provided in said document table;

a sensor drive mechanism for actuating said first image sensor in parallel with said platen plate;

a document moving mechanism for causing a document to move along a document transport path formed in said document table cover, wherein a track of the document which moves through said document transport path passes through a scan point, which is a focal point of said first image sensor achieved when said first image sensor is situated at a standby position, wherein a portion of said document transport path located downstream from said scan point is divided into a first path and a second path;

transport switching means, disposed at a location where said document transport path is divided, for switching said track of the document moving through said document transport path between said first and second paths, wherein said first path is formed in parallel or substantially in parallel to said track of said document transport path at a position upstream of said scan point, and said second path is formed so as to be turned upward;

document thickness detection means, disposed upstream of said scan point, for detecting the thickness of the document to move through said document transport path; and control means for performing a control operation to switch said transport switching means to said first path when the thickness of the document detected by said document thickness detection means is greater than a predetermined threshold value and to switch said transport switching means to said second path when the thickness of the document detected by said document thickness detection means is smaller than said predetermined threshold value.

5. An image reader comprising:

a document table having a platen plate which is made from a translucent member and placed in an upper surface of said document table;

a document table cover supported at an upper end of said document table in a pivotable manner;

a first image sensor provided in said document table;

a sensor drive mechanism for actuating said first image sensor in parallel with said platen plate;

a document moving mechanism for causing a document to move along a document transport path formed in said document table cover;

a second image sensor fixed to said document table cover so as to be situated at a position above said document transport path, wherein a track of the document that moves through said document transport path passes through a scan point, which is a focal point of said first image sensor when said first image sensor is situated at a standby position, wherein a portion of said document transport path, located downstream from said scan point, is divided into a first path and a second path; and transport switching means, disposed at a location where said document transport path is divided, for switching said track of the document moving through said document transport path between said first and second paths, wherein said first path is formed in parallel or substantially in parallel to said track of said document transport path at a position upstream of said scan point, the document traveling through said first path is directly output externally of said document table cover, and said second path is formed so as to be turned upward so that the document traveling through said second path is directly output externally of said document table cover.

6. An image reader according to claim 5, wherein said first path includes a first outlet port directed to a rear side of said document table cover, and the second path includes a second outlet port directed to a front side of said document table cover.

7. An image reader comprising:

a document table having a platen plate which is made from a translucent member and placed in an upper surface of said document table;

a document table cover supported at an upper end of said document table in a pivotable manner;

a first image sensor provided in said document table;

a sensor drive mechanism for actuating said first image sensor in parallel with said platen plate;

a document moving mechanism for causing a document to move along a document transport path formed in said document table cover, wherein a track of the document that moves through said document transport path passes through a scan point, which is a focal point of said first image sensor when said first image sensor is situated at a standby position, wherein a portion of said document transport path, located downstream from said scan point, is divided into a first path and a second path; and transport switching means, disposed at a location where said document transport path is divided, for switching said track of the document moving through said document transport path between said first and second paths, wherein said first path is formed in parallel or substantially in parallel to said track of said document transport path at a position upstream of said scan point, the document traveling through said first path is directly output externally of said document table cover, and said second path is formed so as to be turned upward so that the document traveling through said second path is directly output externally of said document table cover.

8. An image reader according to claim 7, wherein the first path includes a first outlet port directed to a rear side of said document table cover, and the second path includes a second outlet port directed to a front side of said document table cover.

* * * * *